Patented May 23, 1944

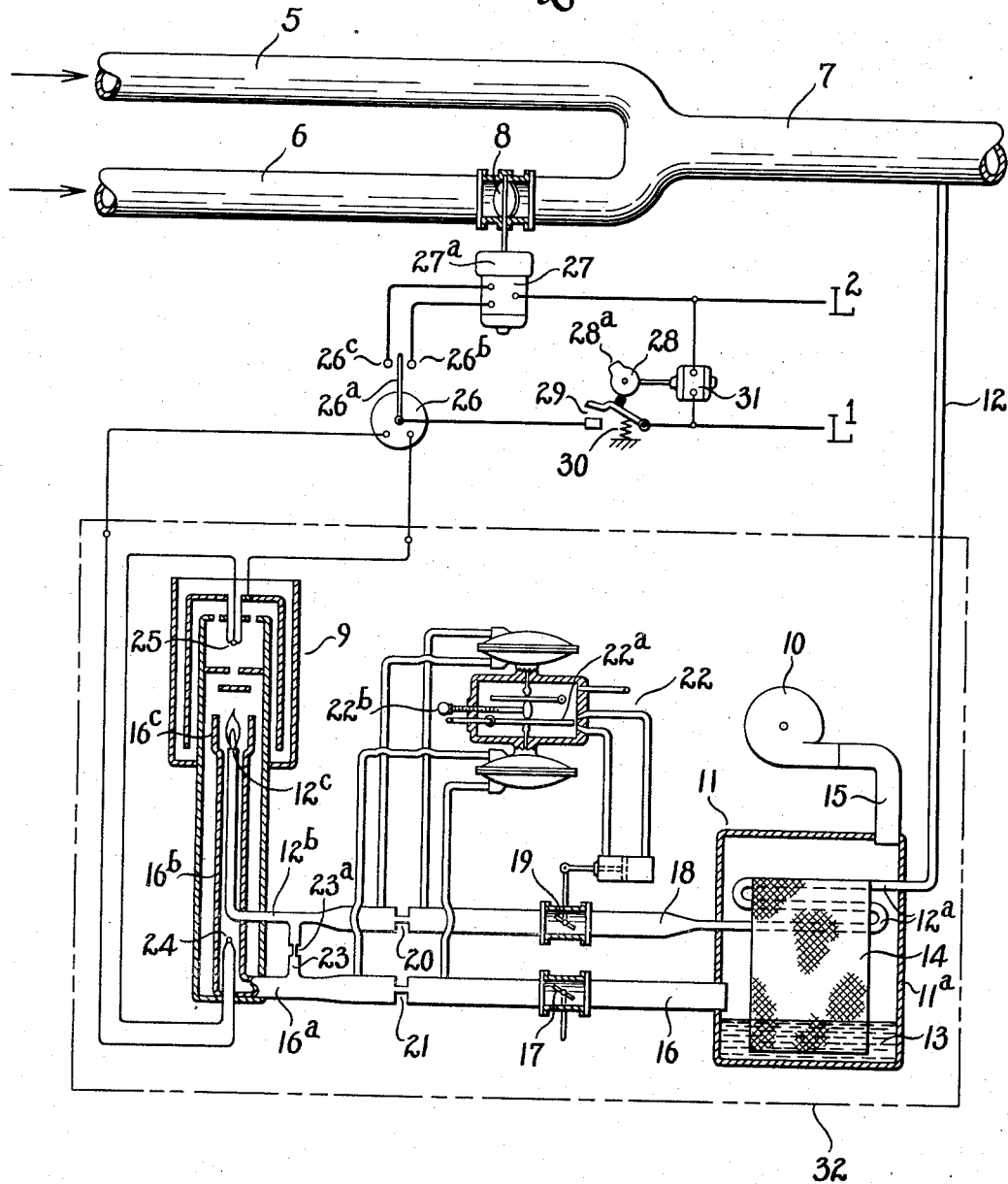

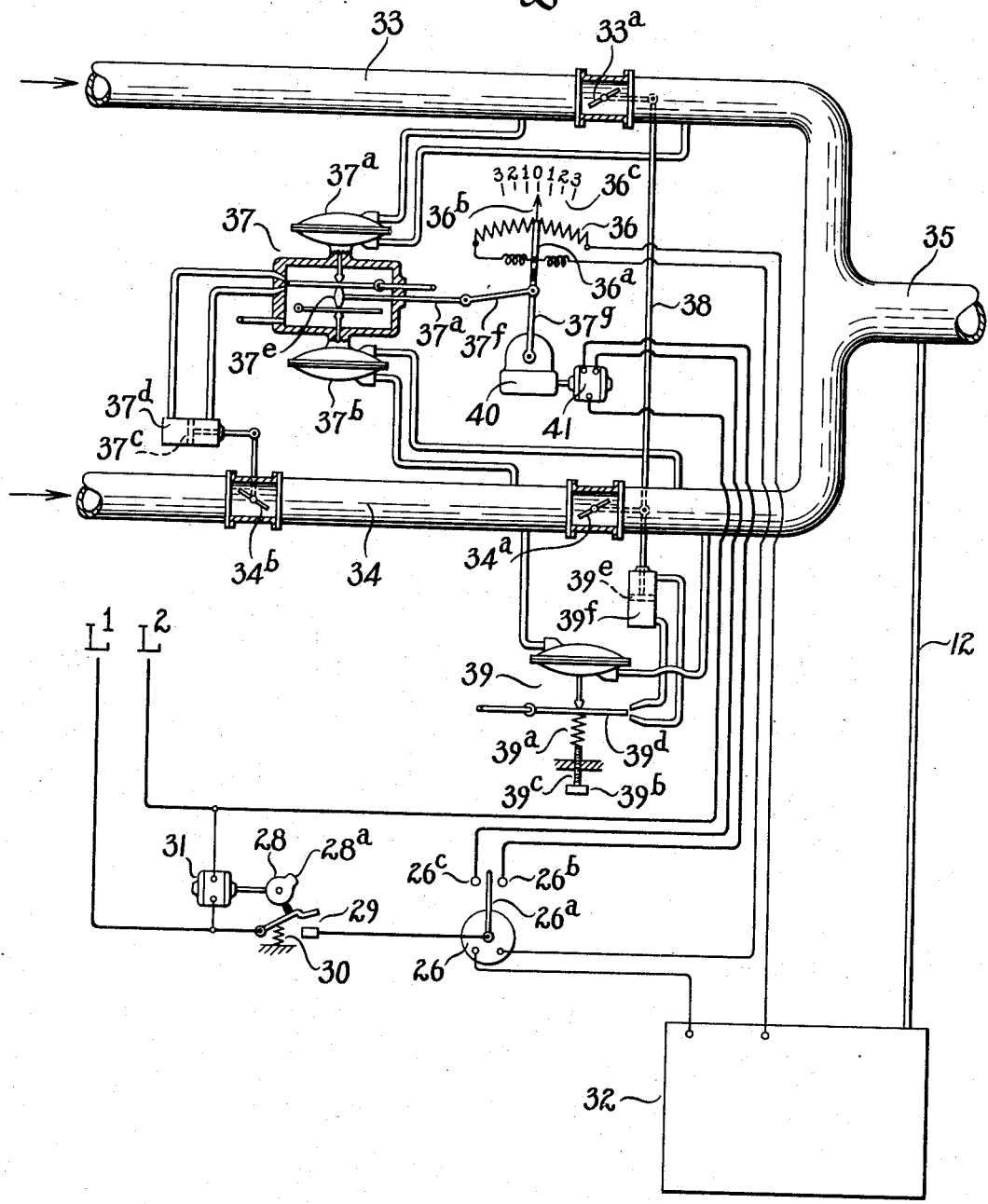

2,349,521

UNITED STATES PATENT OFFICE 2,349,521

METHOD OF AND APPARATUS FOR CONTROLLING THE MIXING OF COMBUSTIBLE GASES

Edwin X. Schmidt, Milwaukee, Wis., assignor to Cutler-Hammer, Inc., Milwaukee, Wis., a corporation of Delaware Application September 28, 1940, Serial No. 358,818

19 Claims. (Cl. 137—78)

This invention relates to improvements in methods of and apparatus for controlling the mixing of combustible gases.

A primary object of the invention is to provide novel methods of and apparatus for controlling mixing of combustible gases for stabilization of the mixture, whereby a constant heat input to commercial burners may be maintained.

Another object is to provide for simplification of methods and apparatus of the aforementioned character.

Another object is to provide methods of and apparatus for calorimetrically ascertaining directly the value of the potential heat flow factor of a mixture of combustible fluids, and for utilizing the value so ascertained to control the proportioning of the constituent fluids of the mixture whereby said value may be maintained substantially constant.

Another object is to provide such methods and apparatus wherein a physical indication of the characteristics of the mixture of combustible fluids is utilized to effect modification of the direct control of the value of the potential heat flow factor of the mixture to compensate for: air requirements for complete combustion; the proportional amount of air in the initial mixture; differences in the reading of the calorimetric device due to differences between net and total heating value per unit volume of the mixture; and variation in the specific heat of the products of combustion, etc.

Another object is to provide a calorimetric system of gas mixing control wherein an operating element subject to control by the calorimetric device is utilized to provide an indication of the proportionality of the constituent gases of the mixture, thus indicating the physical characteristics or condition of one of the constituent gases.

Another and more specific object is to provide a relatively simple and inexpensive calorimetric device which is operable to ascertain directly the value of the potential heat flow factor of a combustible gas or of a mixture of combustible gases.

Another object is to provide a gas mixing control system wherein said calorimetric device is utilized to effect control of the proportionality of the constituents of a combustible mixture of gases whereby the combustion effect of the latter in a furnace or the like is maintained substantially constant.

Other objects and advantages of the invention will hereinafter appear.

The herein described methods and apparatus for stabilizing combustible mixtures of gaseous fluids are particularly advantageous where the physical and/or chemical composition of a gaseous fuel varies in a manner and to degrees which would normally require an adjustment or adjustments of gas burning appliances. By treating all of the gas entering the fuel distribution system in the manner herein contemplated, the need for individual adjustments of gas burning equipment is eliminated.

The volumetric rate at which gas flows through a gas burning appliance is almost universally controlled by maintaining fixed pressure drops across one or more restrictions. The volumetric rate controlled in this manner varies inversely as the square root of the specific gravity of the gas. The rate of liberation of potential heat of combustion in the gas passing through the burner depends upon the heating value per cubic foot of gas multiplied by the volumetric rate of flow. The rate of potential heat liberation in a gas burning equipment will, therefore, depend upon the total heating value per unit volume divided by the square root of the specific gravity of the gas.

The term "potential heat flow factor" (or "$H_p$") referred to herein means "the total heating value per standard cubic foot of gas at 30—60 saturated divided by the square root of the specific gravity." It may be noted that if the value of "$H_p$" is maintained constant even though the rate of potential heat liberated in a burner will vary depending upon variations in temperature and barometric pressure—if the flow of air supporting combustion in the burner is controlled by establishing fixed pressure drops across the orifices, and if the temperature and pressure of the air is the same as or proportional to the temperature and pressure of the gas, variations in temperature and static pressure will not change the proportionality of potential heat flow and combustion air flow supporting combustion thereof.

Although there are differences in the amount of air required per unit of total heat, depending upon the carbon-hydrogen-oxygen content of the gas, these differences are, in general, so small that if the "$H_p$" factor is maintained substantially constant it will provide, with known or commercial forms of gas burning appliances, not only a substantially constant rate of heat input, but also an approximately correct relation of combustion air to gas.

In some instances the amount of combustion air required for a unit of total heat is such that it becomes desirable to modify the value of "$H_p$" with a change in the composition of the gas, whereby the value of the potential heat input is modified slightly to provide a correct air-to-gas ratio for correct combustion. Moreover, where air is used for gas stabilization purposes, modification of the value of the "$H_p$" factor is sometimes necessary or desirable to compensate for variations in the proportional volume of air initially present in the gas.

Methods and apparatus of this general character are disclosed and claimed in my prior Patent No. 2,193,240, granted March 12, 1940. In accordance with the disclosure of said Patent No. 2,193,240 I employed a calorimetric device of known or standard form which tended to function in a manner to adjust the volumetric proportionality of a plurality of flows of combustible fluids whereby the total heating value per unit volume of the mixture of fluids was maintained substantially constant, but having associated means for automatically modifying the calibration of and the controlling effect afforded by the calorimetric device whereby a constant effect of combustion of the mixture was insured notwithstanding variations in the physical and chemical properties of the latter.

As a result of my present invention, however, I have found that equally good or better results may be obtained by employment of a calorimetric device of relatively much simpler and less expensive form than that disclosed in said Patent No. 2,193,240, and that the required compensation for variations in the chemical and physical properties of the mixture of gases may be effected directly in accordance with and as a function of variations in the specific gravity of the gaseous mixture. In accordance with another phase of my present invention the means responsive to variations in the specific gravity of the gaseous mixture are utilized to effect an indication of variations in the physical or chemical characteristics of one of the constituents of said gaseous mixture.

The accompanying drawings illustrate certain embodiments of the invention which will now be described, it being understood that the embodiments illustrated are susceptible of modification in respect of certain structural details thereof without departing from the spirit and scope of my invention as defined by the appended claims.

In the drawings, Figure 1 illustrates schematically and diagrammatically a gas mixing control system constructed in accordance with my invention, and Fig. 2 similarly illustrates a modified form of gas mixing control system embodying my invention.

Referring first to Fig. 1 of the drawings, the numeral 5 designates a conduit through which a combustible gaseous fluid (such as water gas, coke oven gas, natural gas, etc., or a mixture of combustible gases) is adapted to flow, in the direction indicated by the arrow, from any suitable source. It is contemplated that the gaseous fluid flowing in conduit 5 shall be subject to variations in the volumetric rate of flow thereof and/or to variations in the value of the specific gravity (with consequent variations in the total heating value per unit volume) thereof. Numeral 6 designates a conduit through which air (or other combustible gaseous fluid of a known substantially constant total heating value per unit volume) is adapted to flow under a predetermined degree of pressure from a suitable source, such as a pump (not shown). Conduits 5 and 6 jointly discharge into a relatively larger conduit 7 wherein the gaseous fluids from conduits 5 and 6 are mixed, the resulting mixture of fluids being conveyed by conduit 7 to a suitable point or points of use or storage.

Conduit 6 is provided with a so-called butterfly valve 8 which is adjustable automatically in the manner now to be described to so vary the volumetric rate of flow of air through conduit 6 as to provide a flowing gaseous mixture in conduit 7 whose potential heat flow factor is maintained substantially constant—notwithstanding variations in total heating value per unit volume, specific gravity, or volumetric rate of flow of gas through conduit 5.

For this purpose a simple form of flow calorimeter, the burner of which is designated in general by the numeral 9, is adapted to operate upon a sample of the gaseous mixture supplied under its own pressure from the conduit 7. Air, which acts in the burner 9 both to support combustion of the test sample of the gaseous mixture and as the medium for absorbing the heat of combustion of the sample, is supplied at a predetermined substantially constant degree of pressure by a motor driven blower illustrated somewhat diagrammatically at 10. The sample of test gas and the air from blower 10 are adapted to pass, in heat exchanging relationship to each other, through a heat interchanger designated in general by the numeral 11.

More particularly, the gas sample flows from conduit 7 through a relatively small pipe 12—a multple-reflexed or coiled portion 12$^a$ of which is positioned within the closed container 11$^a$ of the heat exchanger 11. Container 11$^a$ is preferably provided with a quantity of water or equivalent liquid 13. A loosely woven cloth 14 is hung over the portion 12$^a$ of conduit 12 and has its lower end portions immersed in the liquid 13. Cloth 14 is kept moist or wet throughout its length by capillary action thereof upon the body of liquid 13. The air from blower 10 enters container 11$^a$ through conduit 15 and leaves said container through conduit 16 which is positioned above the level of the body of liquid 13. The air in its passage through container 11$^a$ of course contacts the moist cloth 14 and the portion 12$^a$ of pipe 12, with the result that the temperatures of the gas sample and air are substantially equalized. Moreover, the aforedescribed treatment of the air during passage thereof through container 11$^a$ will result in saturation of said air with water vapor—so that for a given temperature the water vapor content and gravity of the air is fixed.

The rate of flow of air through conduit 16 is controlled by a hand-set valve 17. The portion 12$^a$ of pipe 12 communicates exteriorly of container 11$^a$ with a conduit 18 which is preferably of the same size in cross section as the conduit 16. Positioned in conduit 18 is a valve 19, which is operable automatically to maintain substantially constant the proportional value of the pressure drop across the gas orifice 20 in conduit 18 with respect to the value of the pressure drop across the air orifice 21 in conduit 16.

The means for effecting automatic adjustment of valve 19 may be of the well known character illustrated in my aforementioned Patent No. 2,193,240 and in Patent No. 1,558,529, granted October 27, 1925, to G. Wunsch, to which patents reference may be had for a detailed description of the operation of such a proportioning device.

It may be pointed out, however, that if the value of the pressure drop across gas orifice 20 is a predetermined degree higher than the value of the pressure drop across air orifice 21 the nozzle 22a of the proportioning means (designated in general by the numeral 22) will be depressed—with consequent movement of valve 19 toward its closed position, pending attainment of a predetermined proportionality of the values of the pressure drops. Conversely, if the value of the pressure drop across gas orifice 20 is a predetermined degree lower than the value of the pressure drop across air orifice 21 the nozzle 22a will be raised, with consequent movement of valve 19 toward its fully opened position pending attainment of said predetermined proportionality of the values of said pressure drops. Manually operable means 22b provide for initially selecting the desired proportional value of the pressure drop across orifice 20 with respect to that across orifice 21.

As shown the gas conduit 18 communicates with a pipe section 12b which enters and extends upwardly within burner 9 to provide the burner tip 12c; whereas air conduit 16 has a portion 16a which enters the lower end of burner 9 and communicates with a portion 18b which extends upwardly around pipe portion 12b and is enlarged at 16c above the burner tip 12c. In practice the gas pipe section 12b and air-conduit portion 16a communicate with each other through a pipe section 23 which is provided with an orifice 23a. By the arrangement illustrated the static pressures upon both the gas and the air supplied to burner 9 are maintained substantially equal, and a predetermined proportionality is maintained between the values of the pressure drops across orifices 20 and 21.

If the specific gravity of the gaseous mixture, as represented by the sample supplied by pipe 12 from conduit 7, should remain constant, the volumetric rates of flow of gas and air to burner 9 would remain in fixed proportionality. However, upon a variation in the specific gravity of the gaseous mixture flowing in conduit 7, the volumetric rate of flow of the gas sample to burner 9 will vary in an inverse ratio to the square root of the value of such specific gravity.

The sample of gas is burned in burner 9—the heat of combustion being given up to the products of combustion and excess air. As will be apparent to those skilled in the art, the arrangement could be alternatively such that the heat of combustion would be given up to a similarly regulated flow of heat absorbing air in a manner to provide for cooling of the products of combustion down to substantially the initial temperature of the gas sample and combustion air.

The cold junction 24 and the hot junction 25 of a thermo-couple are respectively subjected to the temperatures of the incoming air (from conduit portion 16a) and the heated air (or products of combustion) at the upper end of burner 9. The electromotive force produced in the thermocouple is applied to a millivoltmeter shown somewhat diagrammatically at 26. Millivoltmeter 26 may be of either the potentiometer or the current type. This instrument is provided with a contactor 26a which is movable from its neutral position, as illustrated, into engagement with the stationary contact 26b or the stationary contact 26c—thus permitting the split-field type motor 27 to remain idle, or completing one of its alternative circuits to provide for adjustment of valve 8 toward its closed or fully opened positions selectively. Motor 27 is preferably provided with a suitable speed-reducing gearing connection with valve 8, as represented by the numeral 27a. Valve 8 is thus actuated to control the volumetric proportionality between the flow of stabilizing gas (air) in conduit 6 and the flow of the gas, or base fuel, in conduit 5.

If the temperature rise in the burner 9 as indicated by the millivoltmeter 26, is lower than the desired control value, periodic closing adjustments of valve 8 are effected by motor 27 to provide for an increase in the value of the potential heat flow factor "$H_p$" of the gaseous mixture flowing in conduit 7. The duration and frequency of the adjustments of valve 8 will depend upon the shape or design and rate of operation of the cam 28 whose high portion 28a acts to effect closure of the contacts of a switch 29 which is normally biased to circuit interrupting position, as by means of a spring 30. Cam 28 is continuously driven unidirectionally at a predetermined constant speed by a small motor 31 which is connected as shown across lines $L^1$ and $L^2$. In like manner, if the voltmeter 26 shows a temperature rise in the burner 9 which is higher than the desired control value, the valve 8 will be intermittently adjusted toward its fully opened position to provide for a decrease in the value of the potential heat flow factor of the gaseous mixture flowing in conduit 7.

While the burner 9 shown more or less diagrammatically in Fig. 1 has been found entirely satisfactory for my purpose, it will be apparent to those skilled in the art that any other suitable form of burner may be employed if desired.

I believe that I am the first to provide for stabilization of a gaseous mixture by adding to the main flow of gas (in conduit 5) a gas (air in conduit 6) to produce a mixture of combustible gases (flowing in conduit 7) the value of whose potential heat flow factor is directly measured and controlled by a calorimetric device (including the burner 9 and the associated parts within the dotted line rectangle 32 in Fig. 1)—which calorimetric device itself directly responds to variations in the value of the potential heat flow factor of the gas sample supplied to burner 9.

The gas mixing control system illustrated more or less diagrammatically in Fig. 2 is functionally quite similar to that illustrated in Fig. 1—but differs from the latter primarily in respect of providing a potentiometer type rheostat the differential value of whose resistance sections depends upon the instantaneous volumetric proportionality of the rates of flow of gas (in conduit 33) and air (in conduit 34) required to provide a mixture (in conduit 35) having the desired value of its potential heat flow factor. By providing such a rheostat (36, Fig. 2) having the desired characteristics of its resistance sections, the value of the potential heat flow factor (of the mixture in conduit 35) maintained by the calorimetric equipment will be automatically adjusted or varied to compensate for a difference in combustion air requirements and other desired compensation effects which are related to variations in the composition (physical and/or chemical characteristics) of the incoming gas (in conduit 33).

In this connection it may be noted that the position of a part of the ratio slider 37a (of the proportioning device designated in general by the numeral 37) or of a part having a direction and degree of movement corresponding thereto—such as an arrow or pointer 36b attached to and movable with the contactor 36a of rheostat 36—will (when the control elements are in equilibrium)

provide an accurate indication (in conjunction with a dial 36ᶜ or the like) of the volumetric proportionality of the flows of gas and air; and can therefore be utilized as a physical indication of gas conditions (composition, etc.). From the foregoing, it will likewise be apparent to those skilled in the art that some other means; for example, a specific gravity recorder or a calorimeter operating upon either the unstabilized gas (conduit 33) or the sample of stabilized gas (from conduit 35) might be utilized for giving an indication of gas composition, and that this device could be additionally utilized to effect a proper or corresponding adjustment of the control point of the calorimetric device.

More particularly describing the gas mixing control system of Fig. 2, it is to be understood that the elements 12, 26, 28, 29, 31 and 32 may be identical with the corresponding elements aforedescribed—as indicated by the like numerals of reference. As aforeindicated, the rich gas flows through conduit 33 from any suitable source, and the air or similar fluid for diluting or stabilizing the same flows through conduit 34 from any suitable source, such as a pump (not shown) the gas and air being mixed in conduit 35, through which the mixture is conducted to a point or points of use or storage. Here, as in Fig. 1 of the drawings of my prior Patent No. 2,193,240, the air conduit 34 and the gas conduit 33 are respectively provided with valves 34ᵃ and 33ᵃ which are rigidly connected with each other, as by means of a rod or shaft 38, whereby said valves are constrained to move simultaneously toward the fully opened or closed positions thereof respectively.

Any suitable means, such as the device 39, is provided for automatically adjusting valve 34ᵃ to maintain a predetermined substantially constant value of the pressure drop thereacross. The value of the pressure drop to be maintained across valve 34ᵃ may be preselected by manual adjustment of the degree of compression of a spring 39ᵃ, as by means of the knob 39ᵇ attached to the threaded shaft 39ᶜ. Thus upon an increase in the value of the pressure drop across valve 34ᵃ with respect to the value preselected therefore nozzle 39ᵈ will be depressed—with consequent downward movement of piston 39ᵉ within cylinder 39ᶠ, to effect opening movement of valve 34ᵃ pending attainment of the preselected value of pressure drop. In the event of a decrease in the value of the pressure drop across valve 34ᵃ, with respect to the preselected value, spring 39ᵃ will act to raise nozzle 39ᵈ from the neutral position thereof illustrated; and as a consequence piston 39ᵉ will be moved upwardly within cylinder 39ᶠ until the preselected value of the pressure drop is restored. As aforestated, valve 33ᵃ is constrained to move simultaneously in a direction and to a degree corresponding to the adjusting movement of valve 34ᵃ.

In order to maintain a preselected proportionality between the value of the pressure drop across valves 34ᵃ and the value of the pressure drop across valve 33ᵃ I prefer to provide a second valve 34ᵇ in conduit 34 at the upstream side of valve 34ᵃ; which valve 34ᵇ is operable automatically by proportioning means 37 substantially similar to that employed for adjustment of valve 36 in Fig. 1 of my aforementioned Patent No. 2,193,240. Said proportioning means 37 (as described more fully in said Patent No. 2,193,240) includes a pressure operated diaphragm device 37ᵃ responsive to variations in value of the pressure drop across valve 33ᵃ and a pressure operated diaphragm device 37ᵇ to ascertain the value of the pressure drop across valve 34ᵃ; means 37 including elements operable in a well known manner in response to variations in the differential value of said pressure drops to effect movement of piston 37ᶜ in one direction or the other within cylinder 37ᵈ—with consequent adjustment of valve 34ᵇ toward its fully opened or closed position, until a predetermined or desired proportionality is attained between the value of the pressure drop across valve 34ᵃ with respect to the value of the pressure drop across valve 33ᵃ.

The proportional values of the pressure drops across valves 33ᵃ and 34ᵃ are initially predetermined by the position of the so-called ratio slider 37ᵉ. The position of ratio slider 37ᵉ is subject to automatic control through linkage 37ᵃ, 37ᶠ, 37ᵍ and gearing 40, by a split-field reversible motor 41. Motor 41 is in turn subject to automatic control by means substantially identical with the control means of motor 27 (in Fig. 1)— as indicated by the numerals 12, 26, 28, 29, 31 and 32 applied to the corresponding elements in Fig. 2. In the control system of Fig. 2, however, the electrical effect upon millivoltmeter 26 of the E. M. F. supplied by the coaction of the hot and cold junctions of the thermo-couple, forming part of the device 32, is subject to modification by the variations in position of the aforementioned contactor 36ᵃ of the potentiometer type rheostat 36. As shown, contactor 36ᵃ is rigidly attached to but insulated from the element 37ᵍ of the ratio slider linkage—wherefore contactor 36ᵃ will be automatically adjusted in a direction and to a degree corresponding to the direction and degree of adjustment of said slider 37ᵉ.

The effect of such automatic adjustment of rheostat contactor 36ᵃ is to re-calibrate the calorimetric equipment in such manner as to compensate for differences in combustion air requirements, differences in the amount of combustion air initially present in the rich gas (in conduit 33), etc.; thereby insuring the desired control of the potential heat flow factor of the gaseous mixture flowing in conduit 35.

Inasmuch as rheostat contactor 36ᵃ is moved in one direction or the other, to correspond with the required movements of ratio slider 37ᵉ, as an incident to maintenance of a constant value of the potential heat flow factor of the mixture flowing in conduit 35—it is obvious that the instantaneous position of said contactor 36ᵃ (when the control system is in equilibrium) may be utilized as a physical indication of the condition (carbon-hydrogen-oxygen content, etc.) of the rich gas flowing in conduit 33. Accordingly I prefer to provide upon contactor 36ᵃ a pointer 36ᵇ, which is adapted to cooperate with a scale such as 36ᶜ to indicate such condition of the rich gas. Such an indication may, in certain cases, be of great practical importance, since it will enable the supervising operator of the system to take any necessary steps to so modify the initial composition of the gas flowing in conduit 33 as to minimize the amount of adjustment of the volumetric rate of air flow through conduit 34 to provide a mixture in conduit 35 whose potential heat flow factor remains (or is maintained) substantially constant.

Referring again to Fig. 1, it will be apparent, to those skilled in the art, from the foregoing description, that the direction and degree of deflection of contactor 26ᵃ of millivoltmeter 26 from the neutral or intermediate position thereof illustrated may be utilized, in conjunction with a dial (not shown) having suitable legends, to indicate the value of the potential heat flow factor of the flowing sample of the mixture supplied from conduit 7. Where such an indication is desired, the stationary contacts 26$^b$ and 26$^c$ will be biased to the normally spaced positions thereof illustrated in Fig. 1—but each will be movable outwardly from said normal position thereof against its bias to accommodate the total range of movement of contactor 26$^a$ in opposite directions respectively. Stated another way, the contactor 26$^a$ of the millivoltmeter operates or tends to operate in a direction and to a degree directly as a function of the heating value of the gas sample divided by the value of the square root of the specific gravity of such sample—which thus is a measure of the value of the potential heat flow factor of the sample of gas— the means affording automatic adjustment of valve 19 providing for attainment of this novel and desirable result.

What I claim as new and desire to secure by Letters Patent is:

1. In measuring the combustion characteristics of a gas, the method which comprises, effecting a flow of air and a sample flow of the gas to be tested, effecting equalization of the temperatures of said air and gas, effecting creation of pressure drops in the air flow and in the gas flow at points in said flows where the temperatures thereof are equal, effecting proportioning of said pressure drops by adjusting the relative rates of said flows of air and gas, effecting combustion of the sample flow of gas, effecting transfer of the heat of combustion to said flow of air, and effecting measurement of the temperature rise of said flow of air as an indication of the potential heat flow factor.

2. In measuring the combustion characteristics of a gas, the method which comprises, effecting a flow of air and a sample flow of the gas to be tested, effecting equalization of the temperatures of said flows of air and gas, effecting creation of pressure drops in the air flow and in the gas flow at points in the flows where the temperatures thereof are equal, effecting combustion of the sample flow of gas, effecting transfer of the heat of combustion to said flow of air, effecting measurement of the temperature rise of said flow of air, effecting control of the flow of gas to maintain constant said temperature rise, and measuring the square root of the ratio of the aforementioned pressure drops in the air and gas flows as an indication of the potential heat flow factor.

3. In gas mixing, the method which comprises effecting a plurality of flows of combustible fluids, uniting said flows to provide a combustible mixture, effecting a flow of an auxiliary supply of air, effecting a flow of a representative sample of said combustible mixture at a rate to produce a pressure drop proportional to the pressure drop produced by said auxiliary supply of air, effecting burning of said sample in heat interchanging relation to said auxiliary supply of air, effecting measurmenet of the temperature rise produced in the auxiliary supply of air, and varying the proportionality of said first mentioned plurality of flows in accordance with and to compensate for variations in said temperature rise to maintain a substantially constant temperature rise and thereby insure a flowing combustible mixture whose potential heat flow factor is substantially constant.

4. In gas mixing, the method which comprises effecting a plurality of flows of combustible fluids, uniting said flows to provide a flowing combustible mixture, effecting a flow of an auxiliary supply of air, effecting a flow of a representative sample of said combustible mixture at a rate to produce a pressure drop proportional to the pressure drop produced by said auxiliary supply of air, effecting burning of said sample in heat interchanging relation to said auxiliary supply of air, effecting measurement of the temperature rise produced in the auxiliary air, initially varying the proportionality of said first mentioned plurality of flows in accordance with and to compensate for variations in said temperature rise, effecting measurement of a condition which varies as a function of the theoretical air requirement per unit of heat of said combustible mixture, and additionally varying the proportionality of said first mentioned plurality of flows in accordance with and to compensate for variations in the value of said theoretical air requirement, as an incident to variations in the composition of said combustible mixture, to thereby insure a flowing combustible mixture the product of whose potential heat flow factor multiplied by the theorectical air requirement per unit of heat is substantially constant.

5. In a mixing control system for combustible fluids, in combination, means including conduits for effecting a plurality of flows of constituent combustible fluids, means including a conduit for uniting said flows to provide a combustible fluid mixture, means for effecting a flow of auxiliary air, means for effecting a flow of a sample of said combustible mixture, means for equalizing the temperatures of said auxiliary flow of air and said sample flow of said combustible mixture, means for producing pressure drop which vary as a function of the rates divided by the square roots of the specific gravities respectively of said flows of auxiliary air and combustible mixture at a point in the system where said temperatures are equal, means for adjusting the sample flow of said combustible mixture at a value to maintain a predetermined proportionality of said pressure drops, means for burning said sample of the combustible mixture, means for transferring the heat of combustion to the auxiliary supply of air, thermally responsive means for measuring the temperature rise in said flow of auxiliary air resulting from said transfer of heat, and primary control means for controlling the proportionality of said first mentioned plurality of flows in accordance with and to compensate for variations in temperature rise of said auxiliary supply of air to thereby maintain the potential heat flow factor of the combustible mixture substantially constant.

6. In a mixing control system for combustible fluids, in combination, means including conduits for effecting a plurality of flows of constituent combustible fluids, means including a conduit for uniting said flows to provide a combustible fluid mixture, means for effecting a flow of auxiliary air, means for effecting a flow of a sample of said combustible mixture, means for equalizing the temperature of said auxiliary flow of air and said sample flow of said combustible mixture, means for producing pressure drops which vary as a function of the rates divided by the square roots of the specific gravities respectively of said flows of auxiliary air and combustible mixture at a point in the system where said temperatures are equal, means for adjusting the sample flow of said combustible mixture at a value to maintain a predetermined proportionality of said pressure drops, means for burning said sample of the combustible mixture, means for transferring the heat of combustion to the auxiliary supply of air, thermally responsive means for measuring the temperature rise in said auxiliary flow of air resulting from said transfer of heat, means operable automatically for effecting an adjustment of the relative rates of flow of said auxiliary flow of air and said sample flow of said combustible mixture which is related to the potential heat flow factor of the combustible mixture, means for effecting adjustment of said thermally responsive means in accordance with and to compensate for variations in the theoretical air requirement per unit of heat, and primary control means for controlling the proportionality of said first mentioned plurality of flows in accordance with and to compensate for variations in the adjustment of said thermally responsive means, to thereby maintain the potential heat flow factor multiplied by the theoretical air requirement per unit of heat of the combustible mixture substantially constant.

7. In a gas mixing control system, in combination, means for effecting a plurality of flows of combustible gaseous fluids, means for uniting said flows to provide a combustible gaseous mixture, means for effecting a flow of an auxiliary supply of air, means for effecting a flow of a representative sample of said combustible gaseous mixture at a rate adapted to produce a pressure drop proportional to the pressure drop produced by said auxiliary supply of air, means for continuously burning said sample flow of the gaseous mixture in heat interchanging relation to said auxiliary supply of air, means for measuring the value of the temperature rise produced in the auxiliary supply of air, and associated means for automatically varying the proportionality of said first mentioned plurality of flows in accordance with and to compensate for variations in the value of said temperature rise, whereby the value of said temperature rise is maintained substantially constant, to thereby insure a substantially constant value of the potential heat flow factor of said combustible gaseous mixture.

8. In a gas mixing control system, in combination, means for effecting a plurality of flows of combustible gaseous fluids, means for uniting said flows to provide a flowing combustible gaseous mixture, means for effecting a flow of an auxiliary supply of air, means for effecting a flow of a representative sample of said combustible gaseous mixture at a rate adapted to produce a pressure drop proportional to the pressure drop produced by said auxiliary supply of air, means for continuously burning said sample flow of the gaseous mixture in heat interchanging relation to said auxiliary supply of air, means for measuring the value of the temperature rise produced in the auxiliary supply of air, primary means operable in response to and to compensate for variations in said temperature rise to vary the proportionality of said first mentioned plurality of flows, associated means for measuring a condition the value of which varies as a function of the theoretical air requirement per unit of heat of said combustible gaseous mixture, and secondary means for additionally varying the proportionality of said first mentioned plurality of flows in accordance with and to compensate for variations in the value of said theoretical air requirement, as an incident to variations in the composition of said combustible gaseous mixture, to thereby maintain of substantially constant value the product of the heat flow factor multiplied by the theoretical air requirement per unit of heat of said flowing combustible gaseous mixture.

9. In apparatus for measuring the combustion characteristics of a gas, in combination, means for effecting a continuous flow of air and a continuous flow of a sample of the gas to be tested, means for equalizing the temperatures of said air and gas, means for creating pressure drops in the air flow and in the gas flow at points in said flows where the temperatures thereof are equal, means operable automatically in response to the pressure drops so created for adjusting the relative rates of flow of said air and said gas whereby said pressure drops are definitely proportioned relatively to each other, means for effecting combustion of said sample flow of gas, means for effecting transfer of the heat of combustion to said flow of air, means for effecting measurement of the value of the temperature rise of said flow of air, and means for utilizing the value so measured as a continuous indication of the value of the potential heat flow factor of said sample flow of gas.

10. In apparatus for maintaining substantially constant the combustion characteristics of a mixture of combustible gases, in combination, means for effecting a continuous flow of air and a continuous flow of a sample of the mixture, means for equalizing the temperatures of said flows of air and sample, means for creating pressure drops in the air flow and in the sample flow at points in said flows where the temperatures thereof are equal, means for effecting continuous combustion of the sample flow, means for effecting transfer of the heat of combustion to said flow of air, means for effecting measurement of the temperature rise of said flow of air, means operable automatically in response to and in accordance with the operation of said last mentioned means to effect control of the rate of flow of one of the constituent gases of said mixture whereby the value of said temperature rise is maintained substantially constant, and associated means for maintaining a substantially constant relationship between the values of said pressure drops.

11. In apparatus for measuring the combustion characteristics of a flow of gas, in combination, means for effecting a continuous flow of air and a continuous flow of a sample of the gas to be tested, means for equalizing the temperatures of said flows of air and gas, means for creating pressure drops in the air flow and in the gas flow at points in said flows where the temperatures thereof are equal, means for effecting continuous combustion of the sample flow of gas, means for effecting transfer of the heat of combustion to said flow of air, means for effecting measurement of the temperature rise of said flow of air, and means for utilizing said measurement of temperature rise of said flow of air as a direct indication of the potential heat flow factor of said flow of gas.

12. In gas mixing, the method of ascertaining the combustion characteristics of the gaseous mixture, which comprises, effecting a flow of air and a sample flow of the gaseous mixture, effecting equalization of the temperatures of said flows of air and gaseous mixture, effecting creation of pressure drops in the air flow and in the gaseous mixture flow at points in said flows where the temperatures thereof are equal, effecting proportioning of said pressure drops by adjusting the relative rates of said flows of the air and the gaseous mixture, effecting combustion of said flow of the gaseous mixture, effecting transfer of the heat of combustion to said flow of air, ascertaining the value of the temperature rise of said flow of air, and utilizing said ascertained value as a measure of the potential heat flow factor of said gaseous mixture.

13. In gas mixing, the method which comprises, effecting a flow of air and a sample flow of the gaseous mixture, effecting equalization of the temperatures of said flows of air and gaseous mixture, effecting creation of pressure drops in the air flow and in the gaseous mixture flow at points in said flows where the temperatures thereof are equal, effecting proportioning of said pressure drops by adjusting the relative rates of said flows of the air and the gaseous mixture, effecting combustion of said flow of the gaseous mixture, effecting transfer of the heat of combustion to said flow of air, ascertaining the value of the temperature rise of said flow of air, utilizing said ascertained value as a measure of the potential heat flow factor of said gaseous mixture, and varying the volumetric proportionality of the constituents of said gaseous mixture in a manner to maintain said potential heat flow factor thereof substantially constant.

14. In gas mixing, the method of ascertaining the combustion characteristics of the gaseous mixture, which comprises, effecting a flow of air and a sample flow of the gaseous mixture, effecting equalization of the temperatures of said flows of air and gaseous mixture, effecting creation of pressure drops in the air flow and in the gaseous mixture flow at points in the flows where the temperatures thereof are equal, effecting combustion of said flow of the gaseous mixture, effecting transfer of the heat of combustion to said flow of air, effecting measurement of the temperature rise of said flow of air, effecting control of the volumetric rate of flow of said gaseous mixture to maintain substantially constant said temperature rise, ascertaining the value of the square root of the ratio of the aforementioned pressure drops in the flow of air and in the flow of gaseous mixture, and utilizing said ascertained value as a measure of the potential heat flow factor of said gaseous mixture.

15. In gas mixing, the method which comprises, effecting a flow of air and a sample flow of the gaseous mixture, effecting equalization of the temperatures of said flows of air and gaseous mixture, effecting creation of pressure drops in the air flow and in the gaseous mixture flow at points in the flows where the temperatures thereof are equal, effecting combustion of said flow of the gaseous mixture, effecting transfer of the heat of combustion to said flow of air, effecting measurement of the temperature rise of said flow of air, effecting control of the volumetric rate of flow of said gaseous mixture to maintain substantially constant said temperature rise, ascertaining the value of the square root of the ratio of the aforementioned pressure drops in the flow of air and in the flow of gaseous mixture, utilizing said ascertained value as a measure of the potential heat flow factor of said gaseous mixture, and varying the volumetric proportionality of at least one of the constituents of said gaseous mixture in a manner to maintain said potential heat flow factor thereof substantially constant.

16. In gas mixing apparatus, in combination, means for ascertaining the combustion characteristics of the gaseous mixture, comprising, means for effecting a continuous flow of air and a continuous flow of a sample of the gaseous mixture, means for equalizing the temperatures of said flows of air and gaseous mixture, means for creating pressure drops in the flow of air and in the flow of gaseous mixture at points in said flows where the temperatures thereof are equal, means operable automatically in response to the pressure drops so created for adjusting the relative volumetric rates of flow of said air and said gaseous mixture whereby said pressure drops are definitely proportioned relatively to each other, means for effecting combustion of said sample flow of the gaseous mixture, means for effecting transfer of the heat of combustion to said flow of air, means for continuously ascertaining the value of the temperature rise of said flow of air, and means for utilizing said ascertained value as a continuous measure of the potential heat flow factor of said sample flow of the gaseous mixture, for the purpose set forth.

17. In gas mixing apparatus, in combination, means for ascertaining the combustion characteristics of the gaseous mixture, comprising, means for effecting a continuous flow of air and a continuous flow of a sample of the gaseous mixture, means for equalizing the temperatures of said flows of air and gaseous mixture, means for creating pressure drops in the flow of air and in the flow of gaseous mixture at points in said flows where the temperatures thereof are equal, means operable automatically in response to the pressure drops so created for adjusting the relative volumetric rates of flow of said air and said gaseous mixture whereby said pressure drops are definitely proportioned relatively to each other, means for effecting combustion of said sample flow of the gaseous mixture, means for effecting transfer of the heat of combustion to said flow of air, means for continuously ascertaining the value of the temperature rise of said flow of air, means for utilizing said ascertained value as a continuous measure of the potential heat flow factor of said sample flow of the gaseous mixture, and associated means for varying the volumetric proportionality of the constituents of said gaseous mixture in accordance with and to compenaste for variations in the value of said potential heat flow factor, whereby said last mentioned value is maintained substantially constant.

18. In gas mixing apparatus, in combination, means for effecting a continuous flow of air and a continuous initially volumetrically proportioned flow of a sample of the gaseous mixture, means for equalizing the temperatures of said flows of air and gaseous mixture, means for creating pressure drops in the air flow and in the gaseous mixture flow at points in said flows where the temperatures thereof are equal, means for effecting continuous combustion of the sample flow of the gaseous mixture, means for effecting transfer of the heat of combustion to said flow of air, means for ascertaining the value of the temperature rise of said flow of air, and means for utilizing said ascertained value as a direct indication of the potential heat flow factor of said flowing gaseous mixture, for the purpose set forth.

19. In gas mixing apparatus, in combination, means for effecting a continuous flow of air and a continuous initially volumetrically proportioned flow of a sample of the gaseous mixture, means for equalizing the temperatures of said flows of air and gaseous mixture, means for creating pressure drops in the air flow and in the gaseous mixture flow at points in said flows where the temperatures thereof are equal, means for effecting continuous combustion of the sample flow of the gaseous mixture, means for effecting transfer of the heat of combustion to said flow of air, means for ascertaining the value of the temperature rise of said flow of air, means for utilizing said ascertained value as a direct indication of the potential heat flow factor of said flowing gaseous mixture, and associated means for varying the relative volumetric proportionality of the constituents of said gaseous mixture in accordance with and to compensate for variations in the value of said potential heat flow factor, whereby said last mentioned value is maintained substantially constant.

EDWIN X. SCHMIDT.